(12) United States Patent
Schlipf et al.

(10) Patent No.: US 11,192,631 B2
(45) Date of Patent: Dec. 7, 2021

(54) CONNECTION ASSEMBLY FOR TRANSMITTING LOADS BETWEEN TWO WING ELEMENTS

(71) Applicant: Airbus Operations GmbH, Hamburg (DE)

(72) Inventors: Bernhard Schlipf, Hamburg (DE); Florian Lorenz, Hamburg (DE); Dennis Krey, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 379 days.

(21) Appl. No.: 16/442,726

(22) Filed: Jun. 17, 2019

(65) Prior Publication Data

US 2020/0023939 A1 Jan. 23, 2020

(30) Foreign Application Priority Data

Jun. 19, 2018 (DE) .......................... 102018114680.9

(51) Int. Cl.
*B64C 9/02* (2006.01)
*B64C 9/22* (2006.01)
(Continued)

(52) U.S. Cl.
CPC .................. *B64C 9/02* (2013.01); *B64C 9/22* (2013.01); *B64C 9/26* (2013.01); *B64C 13/28* (2013.01); *B64C 2009/143* (2013.01)

(58) Field of Classification Search
CPC .... B64C 9/02; B64C 9/22; B64C 9/24; B64C 9/26; Y10T 403/3286
See application file for complete search history.

(56) References Cited

U.S. PATENT DOCUMENTS 5,158,252 A 10/1992 Sakurai
6,601,801 B1 8/2003 Prow et al.
(Continued)

FOREIGN PATENT DOCUMENTS

| EP | 2669189 A1 | 12/2013 |
| EP | 3326909 A1 | 5/2018 |
| FR | 2314097 A1 | 1/1977 |

OTHER PUBLICATIONS

German Search Report; priority document.

*Primary Examiner* — Richard R. Green
*Assistant Examiner* — Madison Elizabeth Dittner
(74) *Attorney, Agent, or Firm* — Greer, Burns & Crain, Ltd.

(57) ABSTRACT

A C-shaped connection assembly transmits loads in a load plane between a first and a second wing element. The connection assembly comprises a first and a second L-shaped load-bearing device. Each load-bearing device comprises a joint region and two legs extending parallel to the load plane and away from the joint region towards respective end regions. One leg of the first load-bearing device extends parallel to one leg of the second load bearing device. These legs are connected to one another. Two coupling portions which connect the connection assembly to the second wing element are formed in the respective joint regions of the load-bearing devices. Two further coupling portions which connect the connection assembly to the first wing element are formed in respective free end region of the load-bearing device and the joint region of the second load-bearing device.

17 Claims, 7 Drawing Sheets

(51) Int. Cl.
    *B64C 9/26*     (2006.01)
    *B64C 13/28*    (2006.01)
    *B64C 9/14*     (2006.01)

(56) References Cited

U.S. PATENT DOCUMENTS

| | | | |
|---|---|---|---|
| 7,229,049 B2* | 6/2007 | Ambrose | B64C 9/02 244/213 |
| 8,414,214 B2* | 4/2013 | Martin | B66C 23/702 403/85 |
| 8,714,493 B2* | 5/2014 | Morris | B64C 9/26 244/215 |
| 9,108,715 B2 | 8/2015 | Kordel et al. | |
| 9,475,571 B2* | 10/2016 | Saito | B64C 13/36 |
| 9,580,168 B2* | 2/2017 | Fevergeon | B64C 9/04 |
| 10,040,540 B2* | 8/2018 | Bishop | B64C 9/16 |
| 2018/0141637 A1 | 5/2018 | Schlipf et al. | |
| 2020/0231271 A1* | 7/2020 | Everaert | B64C 9/22 |

\* cited by examiner

CONNECTION ASSEMBLY FOR TRANSMITTING LOADS BETWEEN TWO WING ELEMENTS

CROSS-REFERENCES TO RELATED APPLICATIONS

This application claims the benefit of the German patent application No. 102018114680.9 filed on Jun. 19, 2018, the entire disclosures of which are incorporated herein by way of reference.

FIELD OF THE INVENTION

The present application relates to a connection assembly for transmitting loads in a load plane between a first wing element and a second wing element. Further, the application relates to a slat assembly for a main wing of an aircraft and an aircraft comprising a slat assembly.

BACKGROUND OF THE INVENTION

In order to be able to selectively vary the degree of lift provided by an aircraft wing, aircraft wings are typically provided with aerodynamic surfaces which are movably coupled to a main wing such that they can be moved between a stowed position, in which they are disposed within or directly on the main wing, and at least one deployed position, in which they are extended from the main wing. Slats are such movable aerodynamic surfaces disposed at and extendible from the leading edge of the main wing.

Slats are commonly mounted to the main wing by means of a plurality of elongate slat tracks. Each slat track is movable with respect to the main wing between a retracted position corresponding to the stowed position of the slat and an extended position corresponding to the deployed position of the slat. The movement of the slat tracks between the retracted and extended positions is effected by means of a drive arrangement. For example, such a drive arrangement may comprise a drive shaft, which is rotatably driven by a rotary actuator and which is coupled to each of the slat tracks via a respective transmission or gearbox converting the rotary movement of the drive shaft into a synchronous translatory movement of the slat tracks along their longitudinal extension.

The connection between the slat tracks and the slats is typically realized by joints, which comprise a plurality of spherical bearings, such that some degree of movement of the slat with respect to the slat tracks is possible. At least one of the joints is configured as a so-called master joint, which does not allow for lateral displacement between the slat and the respective slat track at the location of the joint. Some of the other joints may be configured as so-called slave joints, which allow for such relative lateral displacement. Overall, the configuration of the joints is such that minor changes in the position and the geometry of the slat with respect to the slat tracks can be compensated for, so that there is at least some degree of decoupling between deformation of the slat and deformation of the main wing.

A relative change in the position of the slat with respect to the slat tracks may occur, for example, in the event that the slat tracks coupled to a single slat are not moved synchronously, i.e., in case of a differential movement of the slat tracks, resulting in skewing of the slat, and may be accommodated by the joints configured in the above manner Relative changes in the lateral position of the slat with respect to the slat track may, for example, occur due to temperature related changes in the spanwise dimension of the slat. These changes also can be accommodated by the previously described joints. However, the arrangement of spherical bearings used in the joints, typically together with multiple links, is relatively complex and expensive and assumes a considerable amount of space.

EP 3 326 909 A1 discloses an alternative interconnection portion between a slat and a slat track which is elastically deformable in such a manner that a first stiffness against deformation about a first axis is at least ten times greater than a second stiffness against deformation about a second axis, which extends perpendicular to the first axis, and also at least ten times a third stiffness against deformation about a third axis, which extends perpendicular to the first and second axes. In a preferred embodiment, the interconnection portion comprises a plurality of plates having two opposite extended surfaces and disposed one on top of the other such that the extended surface of adjacent plates face each other and the plates form a stack. The extended surfaces of the plates are perpendicular to the first axis. Rigidly retaining the slat on a main wing at a desired pitch angle, the interconnection portion is nevertheless able to accommodate forces and allow for elative movement occurring upon skewing of the slat.

Recent changes in regulations require the interconnection not only to meet defined lateral and torsional load requirements but also provide a robust and failsafe link that provides an alternative load path in case the primary load path fails. It is, therefore, an object to provide an interconnection assembly between a first and a second wing element. A further object is to provide a compact interconnection assembly providing the required robustness and lateral flexibility.

SUMMARY OF THE INVENTION

In a first aspect, the problem underlying the present invention is solved by a connection assembly for transmitting loads in a load plane between a first wing element and a second wing element. The connection assembly is C-shaped and comprises a first load-bearing device and a second load-bearing device. Each of the first and second load-bearing devices is L-shaped and comprises a first leg, a second leg and a joint region. The first leg extends parallel to a load plane and away from the joint region towards a first end region. The second leg extends parallel to the load plane and away from the joint region towards a second end region. The second legs of the first and second load-bearing devices extend in parallel to one another. A first coupling portion for connecting the connection assembly to the second wing element is formed in the joint region of the first load-bearing device. A second coupling portion is formed in the second end region of the first load-bearing device and the joint region of the second load-bearing device. A third coupling portion for connecting the connection assembly to the first wing element is formed in the first end region of the first load-bearing device. A fourth coupling portion for connecting the connection assembly to the first wing element is formed in the first end region of the second load-bearing device. The second leg of the second load-bearing device is connected to the second leg of the first load-bearing device.

In other words the connection assembly is provided for connecting a second wing element, e.g., a slat, to a first wing element, e.g., a slat track, and for transmitting loads between the first and the second wing elements. The connection assembly is primarily intended to transmit loads acting in a load plane between the two wing elements. In the example of the connection assembly connecting a slat to a slat track, the load plane may, for example, extend parallel to a plane in which the slat track moves when the slat is moved between a stowed position and a deployed position.

The connection assembly comprises two load-bearing devices or elements which are provided for connecting the two wing elements and for transmitting loads between them. The two load-bearing devices are both L-shaped, i.e., they each comprise two legs extending away from a joint region enclosing an angle of less than 180° but not necessarily of exactly 90°. One of the legs of each load-bearing device is referred to as the first leg, the other as the second leg. Each first leg extends away from the respective joint region towards a first end region and each second leg extends away from the respective joint region towards a second end region. The first and second legs of both load-bearing devices extend parallel to the load plane but not necessarily in or directly adjacent to the load plane or even the same plane. Further, the second legs of the load-bearing devices extend parallel to one another but, as will be described in more detail in the following paragraphs, in opposing directions, i.e., the second leg of the first load-bearing device extends from the joint region of the first load-bearing device towards the joint region of the second load-bearing device and vice versa. The first legs of the load-bearing devices extend away from the respective joint regions generally in the same direction but not necessarily in parallel. In other words, when the first and second load-bearing devices are projected on the load plane, the first legs of the load-bearing devices are on the same side of an axis connecting the joint regions of the load bearing devices. Hence, the shape of the connection assembly formed by the first and second load-bearing devices can be described as C-shaped.

The first and the second load-bearing device may be arranged directly adjacent to one another or even as intermeshing elements. However, it is also possible that the first and second load-bearing device are arranged spaced apart from one another in a direction extending perpendicular to the load plane, i.e., in the spanwise direction of the slat or the main wing.

The connection assembly comprises four coupling portions which are provided for connecting or mounting the connection assembly to the wing elements: the first and the second coupling portion are provided for connecting the connection assembly to the second wing element and the third and the fourth coupling portion are provided for connecting the connection assembly to the first wing element. The coupling portions are formed in one or both of the load-bearing devices. A coupling portion can be formed in a load-bearing device, for example, by providing a recess or hole for receiving a bolt or more generally a connector that mounts the connection assembly to the respective wing element.

The first coupling portion is located in the joint region of the first load-bearing device, i.e., at the location from which the first and second legs of the first load-bearing device extend away. It may but is not necessarily also formed in the second end region of the second load-bearing device. A coupling portion is formed in two load-bearing devices when a connector used for connecting the connection assembly to one of the wing elements is connected to or extends through both of the respective load-bearing devices. The second coupling portion is formed in the joint region of the second load-bearing device and the second end region of the first load-bearing device. Hence, at the second coupling portion the first and the second load-bearing device will both be connected to the second wing element. The third and the fourth coupling portion are each formed in the first end region of the first and the second load-bearing device, respectively.

Hence, the connection assembly is designed such that it can be connected at two mounting points to the each of the first and the second wing element. At the first wing element, the respective mounting points are each connected to one of the load-bearing devices only. At the second wing element, at least one of the two mounting points and preferably both of the mounting points are connected to each of the load-bearing devices. At least the first load-bearing device is furthermore adapted to connect both the mounting points on the second wing element, whereby the position of the second wing element relative to the first wing element in the load plane is fixed.

Additionally, the second legs of the first and the second load-bearing devices are connected to one another such that a second load path between the first and the second wing element is provided in case the first load path should fail.

In addition to providing two load paths, the connection assembly according to the present invention provides a robust connection between the first and the second wing element in the load plane. In particular, in the direction of the first arms of the L-shaped load-bearing devices high loads can be transferred. In other words, the connection assembly provides a high bending stiffness against rotations about a movement axis extending in the load plane and generally parallel to the extension directions of the first arms of the L-shaped load-bearing devices. If, for example, the connection assembly is used to connect a slat-track as the first wing element to a slat forming the second wing element, the connection assembly can be used to ensure that the slat is in the same deployed position in the cord direction of wing.

Further, as the second leg of the first load-bearing device rigidly connects two mounting points at the second wing element, the connection assembly is not as stiff against rotations about a twisting axis extending perpendicular to the load plane. Thus, under normal operating conditions the connection assembly can, for example, prevent a twisting of a slat about an axis extending perpendicular to the load plane. On the other hand, under abnormal high loads the connection assembly is not as rigid against rotations about this axis and may be able to enable some differential rotation within the slat without malfunctioning.

Finally, the connection assembly advantageously does not achieve a high bending stiff about an axis extending perpendicular to the twisting and/or the movement axis. In the previously discussed example of a slat, the connection assembly would not be very stiff against relative changes in the spanwise position of the slat relative to the slat track. Hence, the connection assembly can compensate changes in the spanwise extension of the slat, for example, due to temperature induced changes in the length of the slat.

In a preferred embodiment the second leg of the second load-bearing device is connected to the second leg of the first load-bearing device such that the first load-bearing device and the second load-bearing device can be rotated relative to one another by a predefined first angle and about an adjustment axis extending perpendicular to the load plane and through the second coupling portion.

In other words, in the preferred embodiment the shape of the C is not fixed but the opening angle of the C can be change. This allows, for example, the use of an eccentric bolt for connecting the first load-bearing device at the fourth coupling portion to the first wing element. By rotating the eccentric bolt, the position of the second wing element relative to the first wing element can be adjusted. This makes the installation of the connection assembly easier. In the previously described example, the eccentric bolt can be used to adjust the position of the slat relative to a main wing on which the slat track is mounted. Exemplary embodiments of connection assemblies that allow for a change in opening angle are described as part of the following exemplary embodiments.

It is further preferred if the connecting assembly comprises a first connector for connecting the connection assembly at the first coupling portion to the second wing element and for connecting the second leg of the second load-bearing device to the joint region of the first load-bearing device. In the joint region of the first load-bearing device the first coupling portion is configured to receive the first connector in such a manner that movement of the first load-bearing device relative to the first connector in a plane extending parallel to the load plane is prevented by engagement of the first load-bearing device with the first connector. Further, the first coupling portion is also formed in the second end region of the second load-bearing device. In the second end region of the second load-bearing device the first coupling portion is configured to limit a relative rotation between the first load-bearing device and the second load-bearing device about the adjustment axis to the predefined first angle by providing first and second end stops for engagement of the first connector with the second load-bearing device.

In this preferred embodiment the first coupling portion is also formed in the second load-bearing device. A connector, for example, a bolt, is provided for connecting the connecting assembly to the second wing element. The first coupling portion in the first load-bearing device tightly conforms to the first connector or any bushings or the like provided to mount the first connector in the first connecting portion. As the position of the second wing element is also fixed relative to the first load-bearing device at the second coupling portion, the overall position of the second wing element relative to the first load-bearing element is well defined in the plane extending parallel to the load plane.

The position of the second wing element relative to the second load-bearing device is only defined at the second coupling portion in a plane extending parallel to the load plane. Nevertheless, a connection between the second legs of the load-bearing devices is provided by means of the first connector. In addition, the second wing element can be rotated about the adjustment axis relative to the second load-bearing element. The rotation is limited to a first predefined angle by end stops that are provided at the first coupling portion in the second load-bearing elements. The end stops can, for example, be defined by the shape of the first coupling portion in the second load-bearing device. Preferred shapes are described as exemplary embodiments in the following.

It should be noted that as the first load-bearing device can rotate relative to the second load-bearing device, the second load path is not immediately available if, for example, the second leg of the first load-bearing device should malfunction. The second load-bearing device would likely first rotate relative to the second wing element until the first connector engages one of the end stops. It should also be noted that in this case the rigidity of the connection assembly against rotations about the axis extending perpendicular to the load plane is reduced to the available play between the second load-bearing device and the first connector.

Preferably, in the second end region of the second load-bearing device the first coupling portion is configured as an elongated hole extending along a circle about the adjustment axis.

Alternatively, a shape of the first coupling portion in the second end region of the second load-bearing device when projected on the load plane corresponds to a shape of the first coupling portion in the joint region of the first load-bearing device when projected on the load plane and an area of the first coupling portion in the second end region of the second load-bearing device when projected on the load plane exceeds an area of the first coupling portion in the joint region of the first load-bearing device when projected on the load plane.

In other words, the first coupling portion has a corresponding shape in the first and the second load-bearing device but different dimensions. For example, the first coupling portion may be of cylindrical shape and has in the first load-bearing device a narrower inner diameter than in the second load-bearing device.

In a preferred embodiment the first connector for connecting the connection assembly at the first coupling portion to the second wing element is supported by a first bushing at least in the first load-bearing device. Alternatively or additionally, a second connector for connecting the connection assembly at the second coupling portion to the second wing element and the first load-bearing device to the second load-bearing device is supported by a second bushing in the first and second load-bearing device. Further alternatively or additionally, a third connector for connecting the connection assembly at the third coupling portion to the first wing element is supported by a third bushing in the first load-bearing device. And even further additionally or alternatively, a fourth connector for connecting the connection assembly at the fourth coupling portion to the first wing element is supported by a fourth bushing in the second load-bearing device.

Bushings a preferably provided to reduce the loads on the connectors and may also be used to compensate manufacturing tolerances.

In another preferred embodiment a fifth coupling portion for connecting the first load-bearing device to the second load-bearing device is formed in the second leg of the of the first load-bearing device between the joint region and the second end region of the first load-bearing device. The fifth coupling portion is also formed in the second leg of the second load-bearing device between the joint region and the second end region of the second load-bearing device. The connection assembly further comprises a fifth connector extending through the fifth coupling portion for transferring loads acting parallel to the load plane between the second legs of the first and the second load-bearing devices. In a preferred embodiment the fifth connector is preferably supported by a fifth bushing in the first load-bearing device and the second load-bearing device.

The preferred embodiment includes a fifth coupling portion and a corresponding fifth connector. The fifth coupling portion is provided for connecting the first and second load-bearing devices and provides an additional load path between the second legs of the load-bearing devices. It may also be used to define the opening angle of the C formed by the connection assembly. Additionally, the fifth coupling portion improves the reliability of the C-shaped connection assembly due to the additional, load-carrying connection between the first and the second load-bearing device.

However, in a preferred embodiment the opening angle of the C is also variable when a fifth coupling portion is provided. To this end it is preferred that in the second leg of the second load-bearing device the fifth coupling portion is configured as an elongated hole extending along a circle about the adjustment axis. Alternatively, a shape of the fifth coupling portion in the second leg of the second load-bearing device when projected on the load plane corresponds to a shape of the fifth coupling portion in the second leg of the first load-bearing device when projected on the load plane and an area of the fifth coupling portion in the second leg of the second load-bearing device when projected on the load plane exceeds an area of the fifth coupling portion in the second leg of the first load-bearing device when projected on the load plane.

Hence, the fifth coupling portion may be similarly shaped as the first coupling portion when enabling a change in the opening angle of the C formed by the connecting assembly. It should be noted that the fifth coupling portion can be used in addition or alternatively to a first coupling portion which is also formed in the second load-bearing device.

In a preferred embodiment, the first load-bearing device is formed by a plurality of first plates and the second load-bearing device is formed by a plurality of second plates. Each of the plurality of first plates and each of the plurality of second plates has two opposite extended surfaces. Each extended surface extends parallel to the load plane. The first coupling portion, the second coupling portion and the third coupling portion are at least partially formed in each of plurality of first plates. The first coupling portion, the second coupling portion and the fourth coupling portion are at least partially formed in each of the plurality of second plates. The plurality of first and second plates are disposed on each other in alternating order such that every extended surface of a first plate of the plurality of first plates arranged directly adjacent to an extended surface of another plate is arranged directly adjacent to an extended surface of a second plate of the plurality of second plates and every extended surface of a second plate of the plurality of second plates arranged directly adjacent to an extended surface of another plate is arranged directly adjacent to an extended surface of a first plate of the plurality of first plates.

In the exemplary embodiment the first and second load-bearing devices are not solid elements but each formed from a plurality of plates. The plates are stacked on top of each other such that they form an intermeshing structure. Using stacks of intermeshing plates is particularly preferred as this significantly reduces the rigidity of the connection assembly against bending about the movement axis with the previously discussed advantages. Using stacks of plates advantageously makes it easier to control the stiffness of the connection assembly by varying the number and the thickness of the plates.

In a preferred embodiment first spacer plates are arranged between adjacent first plates of the first load-bearing device in the first end region of the first load-bearing device. Preferably, the third coupling portion is partially formed in the first spacer plates. Alternatively or additionally, second spacer plates are arranged between adjacent second plates of the second load-bearing device in the first end region of the second load-bearing device. Preferably, the fourth coupling portion is partially formed in the second spacer plates.

The spacer plates are used to stabilize the first and second load-bearing device at the respective first end regions. Without the spacer plates there would be gaps between the respective first and second plates as the plates of the respective other load-bearing device do not extend as far (they are only L-shaped, not C-shaped as the entire connection assembly. The first and second spacer plates may advantageously also be used to modify the stiffness of the C-shaped connection assembly, e.g., by varying the material or the dimensions of the spacer plates. They can in particular be used to adapt the bending and torsion properties of the connection assembly.

In an exemplary preferred embodiment the first coupling portion is formed by first cylindrical recesses in the plurality of first plates and the plurality of second plates, wherein at least one and preferably each first cylindrical recess formed in the plurality of first plates has a smaller inner diameter than each first cylindrical recess formed in the plurality of second plates. It is further preferred that the first cylindrical recesses forming the first coupling portion are adapted for receiving the first connector in form of a first mounting bolt for connecting the connecting assembly to the second wing element. The present exemplary embodiment enables a change in the opening angle of the connection assembly.

A first bushing is preferably arranged in the first cylindrical recesses for supporting the first mounting bolt. Using a bushing to mount the mounting bolt in a coupling portion formed in plurality of first and second plates is particularly preferred as it may compensate manufacturing differences and also reduces the stress on the mounting bolt otherwise imposed due to plurality of different plates that each act individually on the bolt.

Furthermore, the second coupling portion is in an exemplary preferred embodiment formed by second cylindrical recesses in the plurality of first plates and the plurality of second plates. The second cylindrical recesses are adapted for receiving the second connector in form of a second mounting bolt for connecting the connection assembly to the second wing element. It is preferred, for example, if the second bushing is arranged in the second cylindrical recesses for supporting the second mounting bolt. Alternatively or additionally, the third coupling portion is formed by third cylindrical recesses in the plurality of first plates. The third cylindrical recesses are adapted for receiving the third connector in form of a third mounting bolt for connecting the connection assembly to the first wing element. The third bushing is in an exemplary preferred embodiment arranged in the third cylindrical recesses for supporting the third mounting bolt. Alternatively or additionally, the fourth coupling portion is formed by fourth cylindrical recesses in the plurality of second plates. The fourth cylindrical recesses are adapted for receiving the fourth connector in form of a fourth mounting bolt for connecting the connection assembly to the first wing element. Preferably, the fourth bushing is arranged in the fourth cylindrical recesses for supporting the fourth mounting bolt.

Using cylindrically recesses is particularly preferred as it enables the use of bolts for connecting or mounting the connecting assembly to the wing elements. Bolts require less space and are considerably less expensive than previously used spherical bearings. However, it should be noted that the present embodiments may also be used with spherical bearings, if necessary.

In another preferred embodiment a clamping element is provided extending around the second legs of the first load-bearing device and the second load-bearing device between the first coupling portion and the second coupling portion and holding the first load-bearing device and the second load-bearing device together such that loads acting parallel to the load plane can be transferred between the second legs of the first load-bearing device and the second load-bearing device via the clamping element.

The clamping element can, for example, be formed similarly to a clamping element used to keep the leafs of a leaf spring together. If the clamping element is only attached after the connection assembly has been installed, it may be possible to maintain the option of adjusting the opening angle of the connection assembly.

In another aspect the problem underlying the present invention is solved by a slat assembly for a main wing of an aircraft. The slat assembly comprises a slat and an elongate slat track, wherein the slat is connected to the slat track by means of a connection assembly according to any of the preceding embodiments and wherein the slat track is provided for movably connecting the slat assembly to the main wing.

The advantages of the slat assembly correspond to the advantages of the connection assembly used therein.

It is further preferred that the first and the second coupling portion are connected to the slat and wherein the third and the fourth coupling portion are connected to the slat track. However, it should be noted that the first and second coupling portion may also be attached to the slat track and the third and fourth coupling portions to the slat.

Additionally, it is preferred that the slat comprises a first and a second limiting means, wherein the first limiting means and the second limiting means are attached to the slat and provided for engaging at least one of the second legs of the first load-bearing device and the second load-bearing device to limit a rotation of at least one of the first load-bearing device and the second load-bearing device relative to the slat about the adjustment axis to a predefined second angle.

The limiting means provide an additional means for ensuring a second load path and limit the relative rotation of the first and second load-bearing devices relative to each other.

Finally, in another aspect the problem underlying the present invention is solved by an aircraft comprising a main wing and a slat assembly according to any of the preceding embodiments, wherein the slat of the slat assembly is mounted to the main wing by means of the slat track and the connection assembly.

The advantages of the different embodiments of the aircraft correspond to the advantages of the embodiment of the slat assembly employed therein.

BRIEF DESCRIPTION OF THE DRAWINGS

In the following the present invention will be described in more details with reference to exemplary embodiments of connection assemblies, slat assemblies and an aircraft shown in the drawings, wherein.

DETAILED DESCRIPTION OF THE PREFERRED EMBODIMENTS

Figure 1:
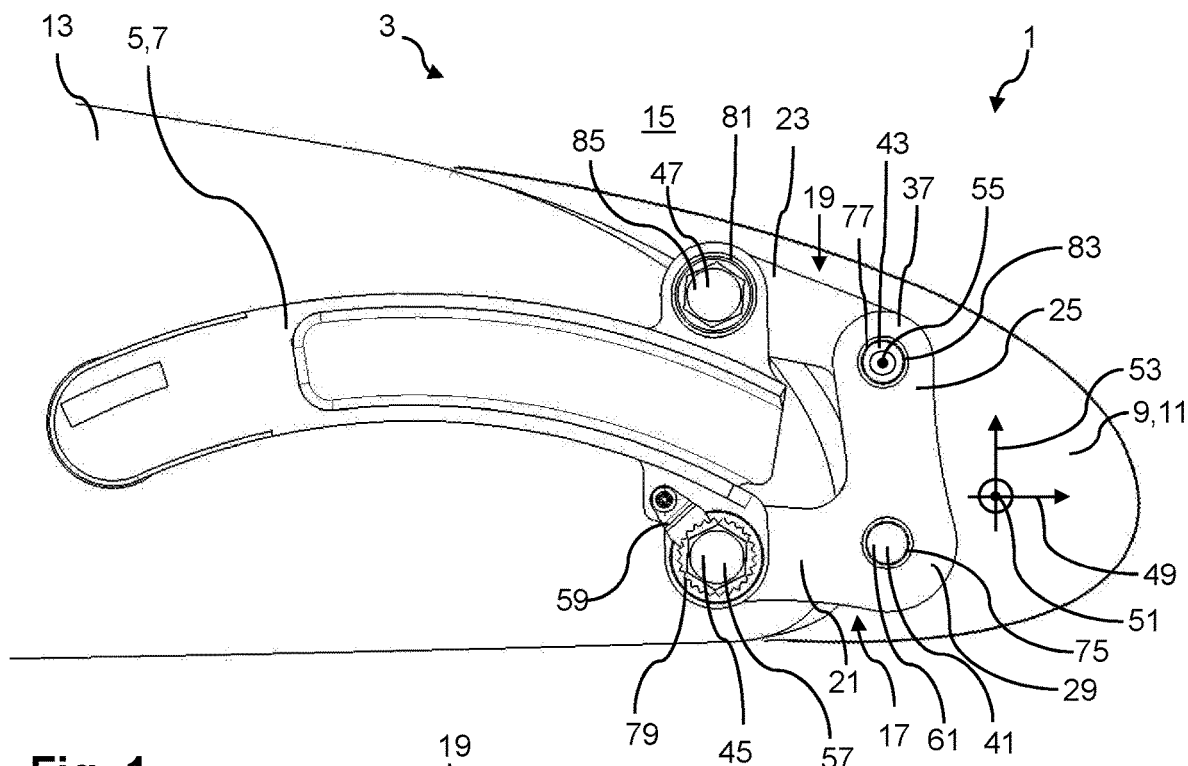
FIG. 1 shows a sectional view of an exemplary embodiment of a slat assembly comprising an exemplary embodiment of a connection assembly.
Figure 2:
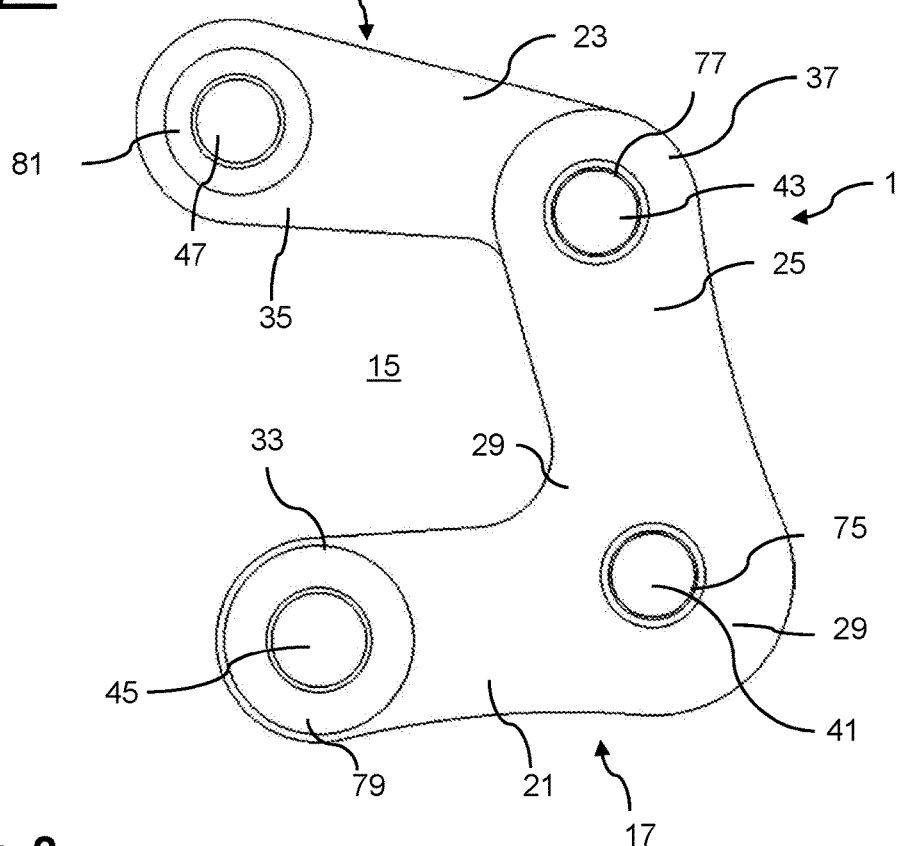
FIG. 2 shows a side view of the connection assembly of FIG. 1.

In the following, a first exemplary embodiment of a connection assembly 1 used in a slat assembly 3 will be described with reference to FIGS. 1 to 5 and 12. Throughout the Figures, like reference numerals are used to indicate like elements. Not all features of the exemplary embodiments are depicted in all Figures. In particular, the slat assembly 3 is only shown in FIG. 1, whereas the connection assembly 1 is shown in all Figures. If a feature is particularly well depicted in a specific Figure, reference will be made to that Figure. Otherwise it is understood that a Figure at least shows those features of the exemplary embodiments mentioned in the description with specific reference to that Figure unless stated otherwise.

FIG. 1 shows an exemplary embodiment of a connection assembly 1 used as part of a slat assembly 3 for connecting a first wing element 5 in form of a slat track 7 to a second wing element 9 in form of a slat 11. The slat track 7 is mounted to a main wing 13 which is only partly shown in FIG. 1. The slat track 7 is provided for moving the slat 11 between a stowed position shown in FIG. 1 and one or more deployed positions not shown in the Figures.

The slat track 7 is also referred to as a slave slat track 7 as it is intended to define in the position of the slat 11 relative to the main wing 13 only in a load plane 15 and to allow spanwise displacements of the slat 11 relative to the main wing 13 and the slat track 7 along an axis extending perpendicular to the load plane 15. The load plane 15 correspond to the sectional plane of the sectional view shown in FIG. 1 and corresponds to or extends parallel to a movement plane in which the slat track 7 moves when the slat 11 is moved between the stowed and one of the deployed positions. Drive means are provided on the main wing 13 for moving the slat track 7 relative to the main wing 13. However, the drive means are not shown in the Figures.

The connection assembly 1 is C-shaped and comprises a first L-shaped load-bearing device 17 and a second L-shaped load-bearing device 19. Each of the load-bearing devices 17, 19 comprises a first leg 21, 23, a second leg 25, 27 and a joint region 29, 31. The second leg 27 and the joint region 31 of the second load-bearing device 19 are not shown in FIG. 1 but can, for example, be seen in FIG. 5. The first legs 19, 21 of the load-bearing devices 17, 19 extend away from the respective joint regions 29, 31 towards first end regions 33, 35; the second legs 25, 27 extend away from the respective joint regions 29, 31 towards second end regions 37, 39. The load-bearing devices are L shaped in that the respective first and second legs 25, 27, 29, 31 enclose an angle of less than 180° and preferably about 90°.

As can be seen in FIG. 1, the connection assembly 1 comprises four coupling portions 41, 43, 45, 47 at which the connection assembly is connected or mounted to the first and second wing element 5, 9. In detail, the first and second coupling portions 41, 43 are provided for mounting the connection assembly 1 to the second wing element 9 and the third and fourth coupling portions 45, 47 are provided for mounting the connection assembly 1 to the first wing element 5.

The coupling portions 41, 43, 45, 47 are formed in different parts of the C-shaped connection assembly. Not all coupling portions 41, 43, 45, 47 of formed in both load-bearing devices 17, 19. In the exemplary embodiment shown in FIG. 1 the first coupling portion 41 is formed in the joint region 29 of the first load-bearing device 17 and in the second end region 39 of the second load-bearing device 19. The second coupling portion 43 is always formed in the second end region 37 of the first load-bearing device 17 and the joint region 31 of the second load-bearing device 19. The third and fourth coupling portions 45, 47 of formed in the first end portions 33, 35 of the first and second load-bearing device 17, 19, respectively.

Hence, the slat track 7 is connected to each of the load-bearing devices 17, 19 at one coupling portion 45, 47 only. The slat 11 on the other hand is connected to each of the first and second load-bearing devices 17, 19 at two coupling portions 41, 43. This ensures that the position of the slat 11 respect to the slat track 7 is well defined in the load plane 15 once the connection assembly 1 has been installed.

Additionally, the connection assembly 1 provides a high stiffness against rotations between the slat track 7 and the slat 11 about a movement axis 49 extending approximately parallel to the first legs 21, 23 of the load-bearing devices 17, 19 and parallel to the load plane 15. Thereby, the connection assembly 1 provides a robust positioning of the slat 11 in the deployed positions.

Furthermore, by means of the two connections established between the slat 11 and the second leg 25 of the first load-bearing device 17, the connection assembly 1 is also robust against rotations about a spanwise axis 51. This advantageously prevents a twisting of the slat 11 in a spanwise direction and ensures a well-defined position relative to the main wing 13.

The connection assembly 1 provides only a very limited stiffness against rotations between the slat 11 and the slat track 7 about a third axis 53 extending perpendicular to the movement axis 49 and the spanwise axis 51. This advantageously allows changes in the relative spanwise position of the slat 11 and slat track 7 for compensating changes in the lateral extension of the slat 7, e.g., due to temperature changes, without requiring expensive and heavy spherical bearings.

The connection assembly 1 is also robust in that it provides two different load paths between the slat 11 and the slat track 7 by means of the two independent load-bearing devices 17, 19. Even if one of the load-bearing devices 17, 19 should fail, the other load-bearing device will still be able to provide a sufficiently accurate positioning of the slat 7 relative to the slat track 11.

Figure 3:
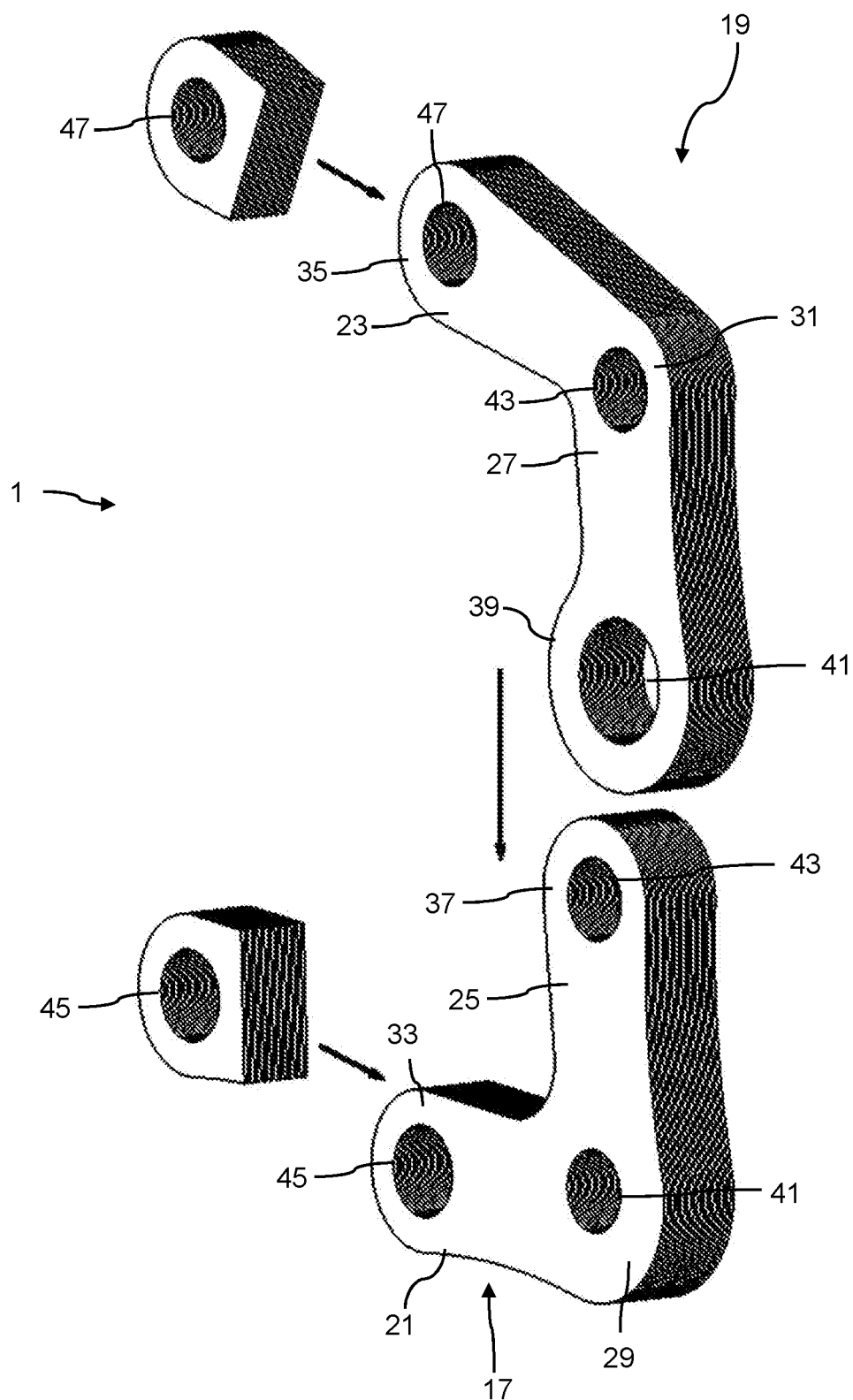
FIG. 3 shows a partly exploded view of the connection assembly of FIG. 2.
Figure 4:
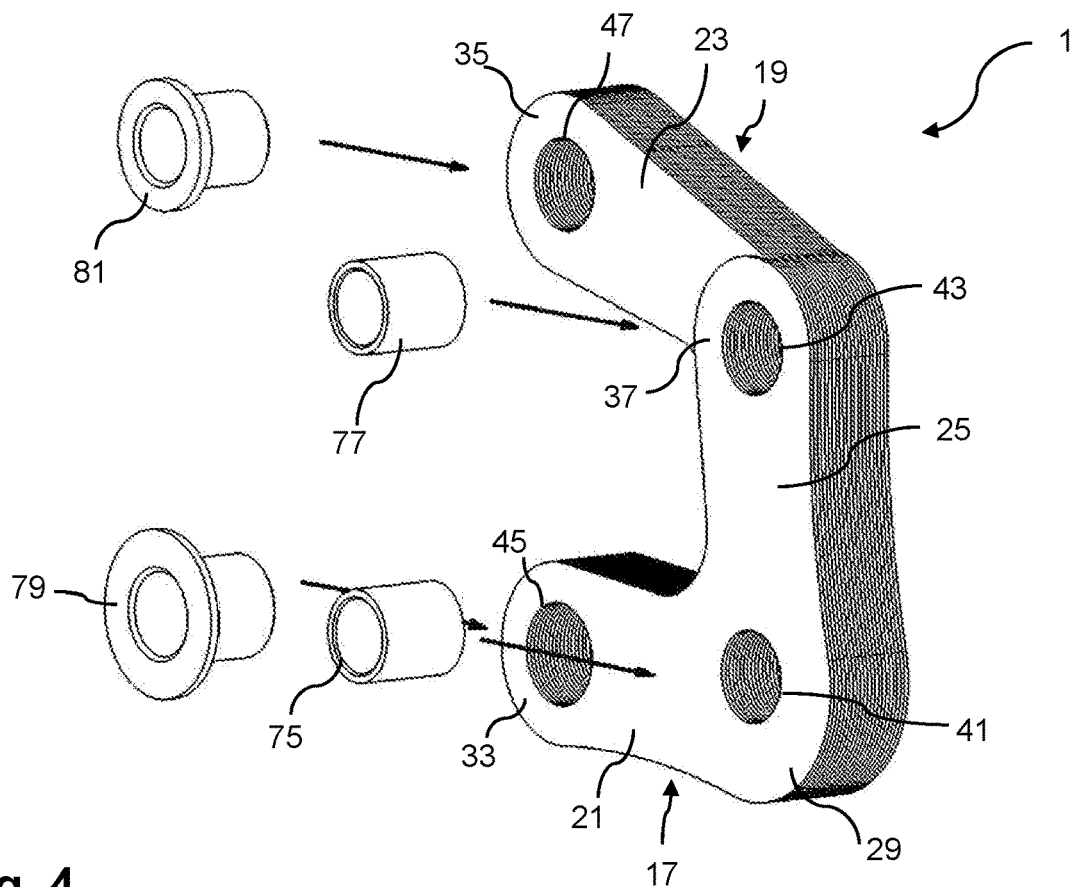
FIG. 4 shows a further partly exploded view of the connection assembly of FIG. 2.
Figure 5:
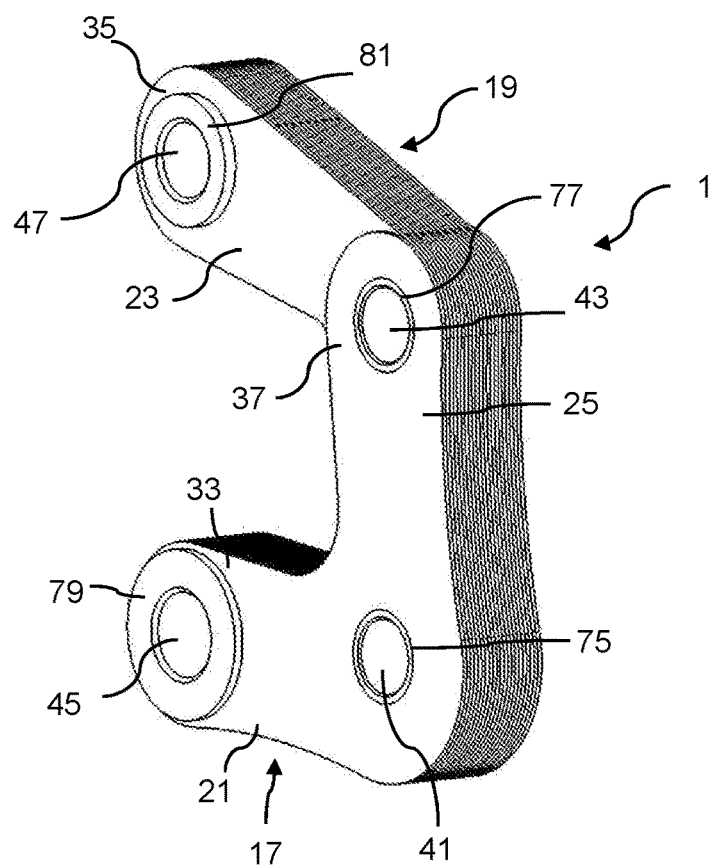
FIG. 5 shows an elevated view of the connection assembly of FIG. 2.

As can be seen best in FIG. 3, the opening angle of the C-shaped connection assembly 1 can be varied in the exemplary embodiment shown in FIGS. 1 to 5. In particular, it is possible to rotate the first and second load-bearing devices 17, 19 relative to one another about an adjustment axis 55 extending perpendicular to the load plane 15 and through the second coupling portion 43. Providing a variable opening angle allows compensating for manufacturing tolerances and also to adjust the relative position of the slat 11 and the main wing 13. To this end and eccentric mounting bolt 57 can be used to connect the connection assembly 1 at the third coupling portion 45 to the slat track 7. By rotating the eccentric mounting bolt 57 the relative position of the first load-bearing device 17 and the slat track 7 in a plane extending parallel to the load plane 15 can be varied. FIG. 1 shows an adjusting mechanism 59 provided for fixing the rotational position of the mounting bolt 57 relative to the slat track 7.

The relative motion between the first and the second load-bearing devices 17, 19 is made possible by the different dimensions of the first coupling portion 41 in the first and second load bearing device 17, 19. As can be seen best in FIG. 3, the first coupling portion 41 is of cylindrical shape in both the first and second load-bearing device 17, 19. However, in the first load-bearing device 17 the first coupling portion 41 has a narrower internal diameter than in the second load-bearing device 19. Hence, the second load-bearing device 19 can be rotated about the adjustment axis 55 until a first connector 61 extending through the first coupling portion 41, for example, a first mounting bolt, engages with the edge of the second load-bearing device 19 delimiting the recess forming the first coupling portion 41. The first connector 61 is only shown in FIG. 1.

As the width of the first coupling portion 41 in the second load-bearing device 19 limits the angle about which the first and second load-bearing device 17, 19 can be rotated relative to each other, a rotation is only possible about a predefined limited angle.

Figure 13:
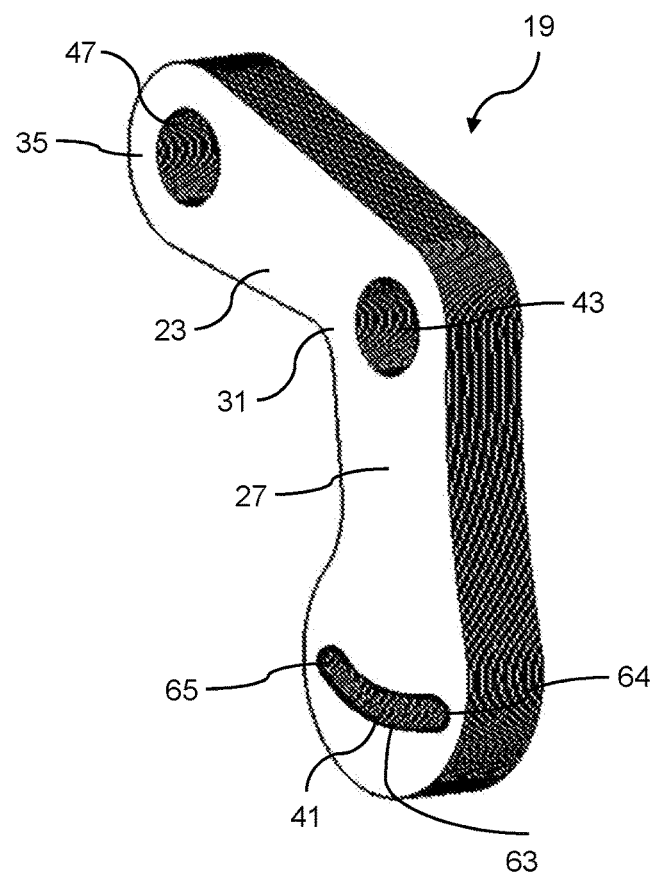
FIG. 13 shows an alternative embodiment of a second load-bearing device.

An alternative embodiment of a second load-bearing device 19 is shown in FIG. 13. The attentive embodiment could be used in the connection assembly 1 shown in FIGS. 1 to 5. The second load-bearing device 19 of the FIG. 13 differs from the previously discussed second load-bearing device 19 in that the first coupling portion 41 is formed as an elongated hole 63 instead of a cylindrical hole. The elongated hole 63 follows an arc about the adjustment axis 55 and so that the first connector 61 is guided in the elongated hole 63 when the first and the second load-bearing device 17, 19 are rotated relative to each other about the adjustment axis 55. The lateral ends 64, 65 of the elongated hole 63 form first and second end stops 64, 65 delimiting the angle about which the first and the second load-bearing device 17, 19 can be rotated relative to each other.

The remaining features of the second load-bearing device 19 shown in FIG. 13 correspond to the features of the second load-bearing device 19 shown in FIGS. 1 to 5 and are, therefore, not discussed here in further detail. It should be noted that as a relative rotation of the first and the second load-bearing devices 17, 19 is possible, the second load path may not be immediately available when the first load-bearing device 17 should fail as the second load-bearing device 19 will need to rotate relative to the second wing element 9 until the first connector 61 engages with the edge of the second load bearing device 19 delimiting the oversized first coupling portion in the second load bearing device 19.

The first and second load-bearing devices 17, 19 of the connection assembly 1 are not formed from a single piece each. Instead they are each made up from a plurality of first and second plates 67, 69 as can be seen best in the exploded view of FIG. 12. The first and second plates 67, 69 each comprises two extended surfaces that extend parallel to the load plane 15. From FIG. 12 it can also be taken that the first and second load-bearing devices are arranged in an alternating order, i.e., the first and second load-bearing devices are intermeshing with each other. Hence, every first plate 67 is arranged directly adjacent to at least one second plate 69 such that every extended surface of a first plate 67, 69 that is in direct contact with another extended surface of a first or second plate 67, 69 is in direct contact with an extended surface of a second plate 69 and vice versa.

The connection assembly 1 further comprises first and second spacer plates 71, 73 that are arranged between adjacent first and second plates 67, 69, respectively, in the area of the respective first end regions 33, 35. The spacer plates 71, 73 fill the gaps between the first and second plates 67, 69 where the first and second load-bearing devices 17, 19 do not overlap, i.e., where they are not arranged directly adjacent to one another. The third and fourth coupling portions 45, 47 are also formed in the first and second spacer plates 71, 73 as can be seen in FIG. 12.

Figure 12:
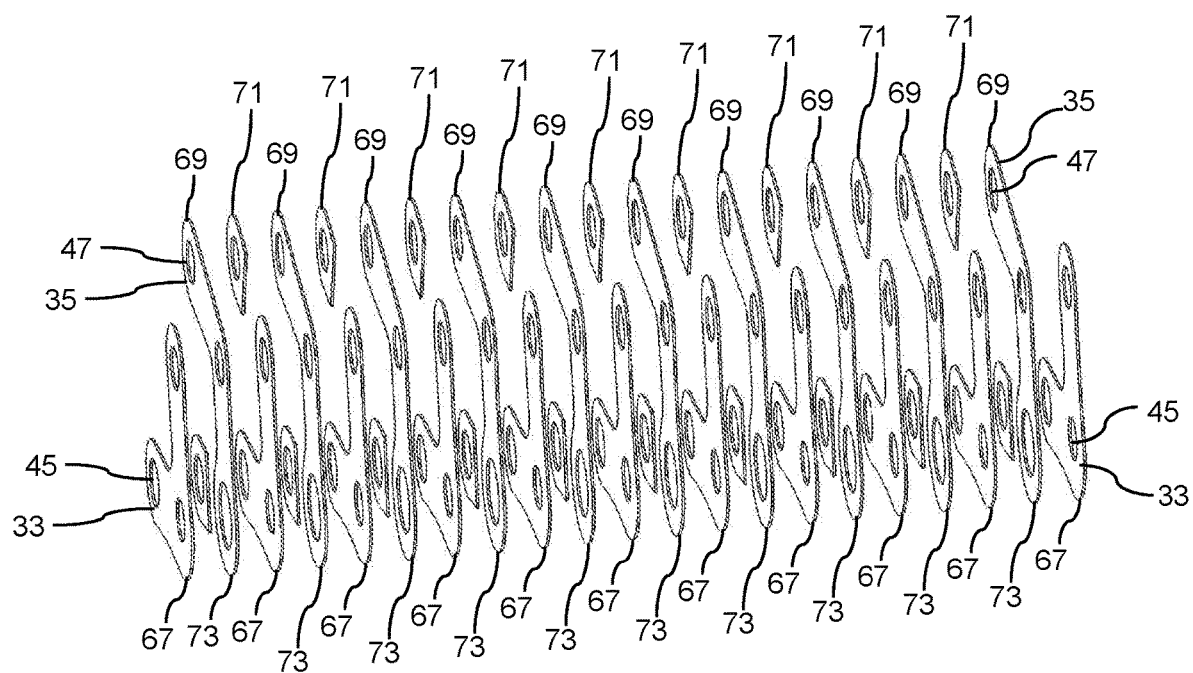
FIG. 12 shows an exploded view of the connection assembly of FIG. 2.

In FIG. 12 only few of the first end sections 33, 35 and only few of the third and fourth coupling portions have been indicated with reference numerals to keep FIG. 12 intelligible. Also several other reference numerals have been omitted from the Figure for the same reason.

Providing first and second load-bearing devices 17, 19 in the form of stacks of first and second plates 67, 69 has the advantage that the load-bearing devices have a high torsional rigidity about the movement axis 49, a lower torsional rigidity about the spanwise axis 51 and very low torsional rigidity about the third axis 53. As already discussed, the different torsional rigidities are advantageous for mounting slats 11 to slat track 7 as they allow dispensing with previously required spherical bearings which are expensive, heavy and bulky. Furthermore, having two parallel first legs 21, 23 allows designing a compact connection assembly 1 which requires only little space between the slat 11 and the main wing 13. This is particularly advantageous from an aerodynamics perspective.

As can be best seen in FIG. 12, the first, second, third and fourth coupling portions 41, 43, 45, 47 are formed as cylindrical recesses extending in the first and second plates 67, 69 and the first and second spacer plates 71, 73.

Finally, FIGS. 1, 2, 4 and 5 show first, second, third and fourth bushings 75, 77, 79, 81 arranged in (FIGS. 1, 2 and 5) or to be arranged in (FIG. 4) the respective first, second, third and fourth coupling portions 41, 43, 45, 47. The bushings 75, 77, 79, 81 are provided for mounting the respective first, second, third and fourth connectors or mounting bolts 61, 83, 57, 85 in the respective coupling portions 41, 43, 45, 47. The bushings 75, 77, 79, 81 advantageously compensate production tolerances and reduce the local stress imposed on the mounting bolts 61, 83, 57, 85 by the numerous edges of the first and second plates 67, 69 and the first and second spacer plate 71, 73. The mounting bolts 61, 83, 85, 45 are only shown in FIG. 1.

Figure 6:
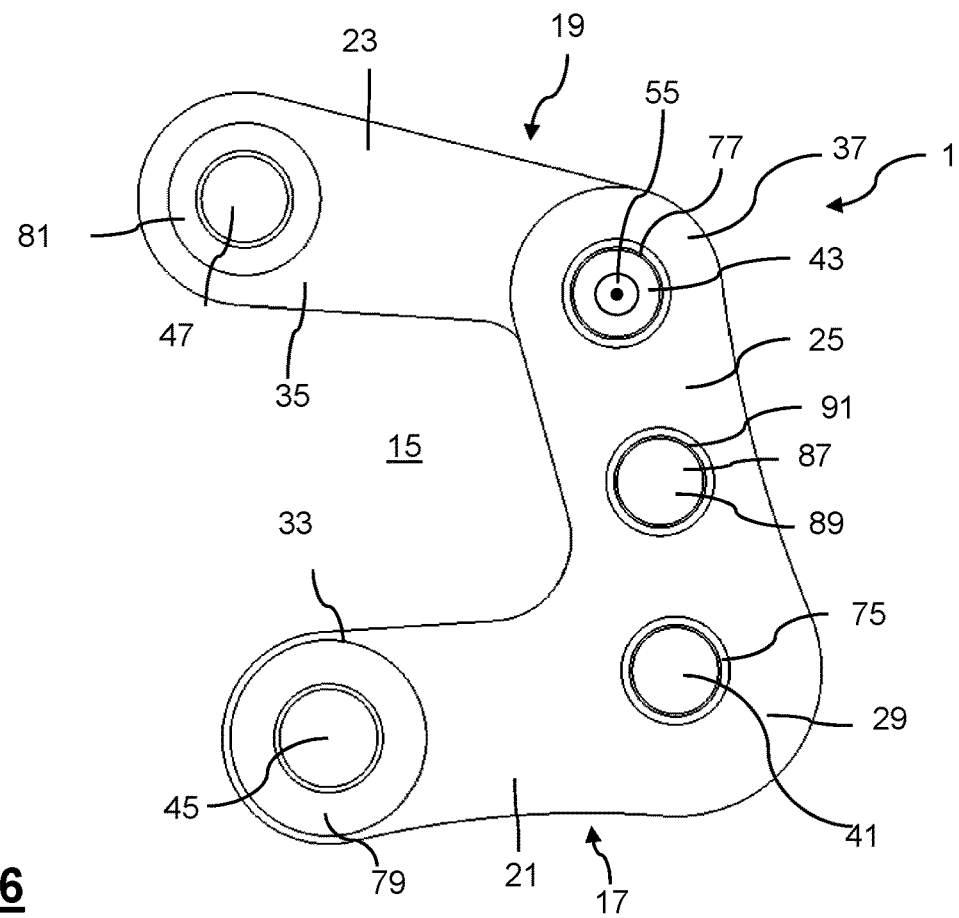
FIG. 6 shows a side view of a second exemplary embodiment of a connection assembly.
Figure 7:
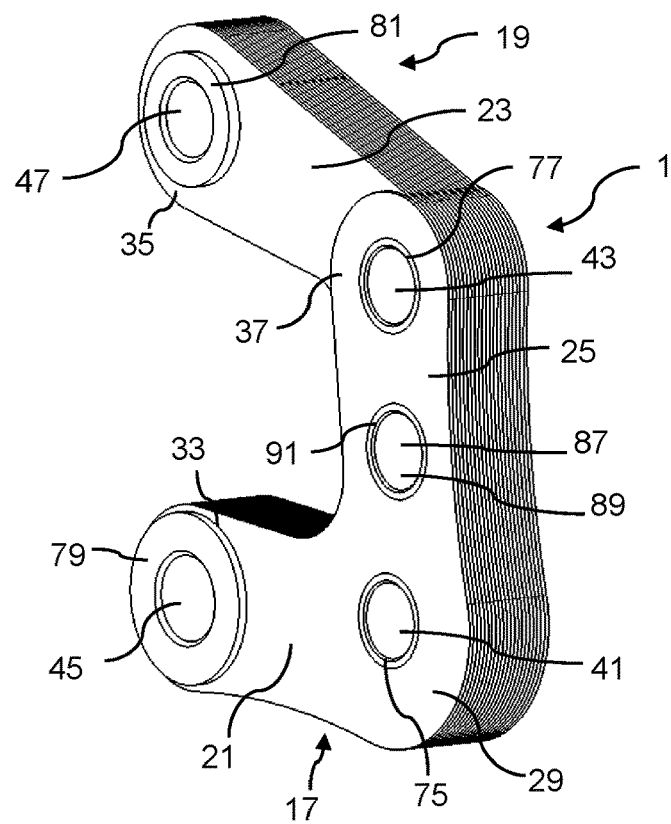
FIG. 7 shows an elevated view of the connection assembly of FIG. 6.

FIGS. 6 and 7 show a second embodiment of a connection assembly 1. Only those elements of the second embodiment will be described in the following that differ from the embodiments described with reference to FIGS. 1 to 5, 12 and 13.

The connection assembly 1 of FIGS. 6 and 7 differs from the first embodiment in that a fifth coupling portion 87 is provided. The fifth coupling portion 87 is formed in the second legs 25, 27 of the first and second load-bearing devices 17, 19 between the first and the second coupling portions 41, 43. A fifth connector 89 is arranged in the fifth coupling portion 87 and connects the first and second load-bearing devices 17, 19. Thereby, a load path is provided between the first and second load-bearing devices 17, 19 that improves the robustness of the connection assembly 1 in case one of the load-bearing devices 17, 19 should fail. As can be seen in FIGS. 6 and 7, the fifth connector 89 is a connection bolt supported by or arranged in a fifth bearing 91. The fifth bearing 91 has the same advantages as the previously described bearings 75, 77, 79, 81.

In order to keep the opening angle of the C-shaped connection assembly 1 variable, the fifth coupling portion 87 can be designed similarly to the first coupling portion 41 in that the fifth coupling portion 87 is oversized in the second load-bearing device 19 to allow a relative rotational movement of the first and second load-bearing devices 17, 19 about the adjustment axis 55 and provide end stops limiting the rotation to a predefined angle.

Figure 8:
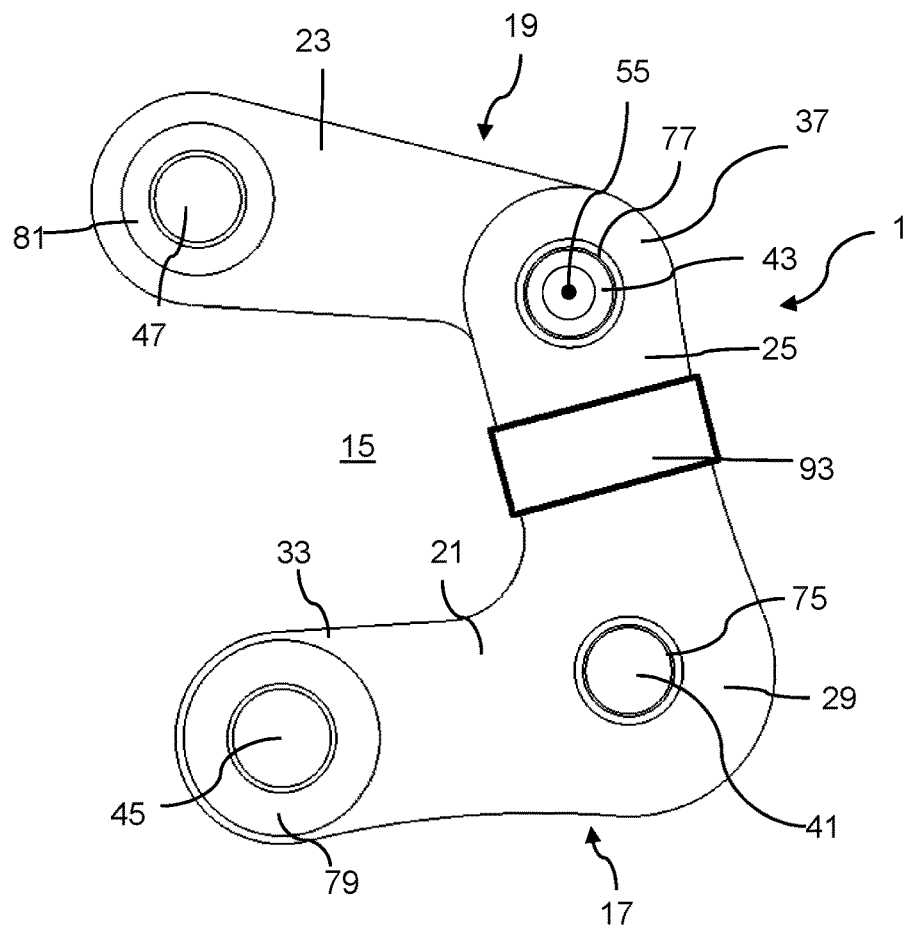
FIG. 8 shows a side view of a third exemplary embodiment of a connection assembly.
Figure 9:
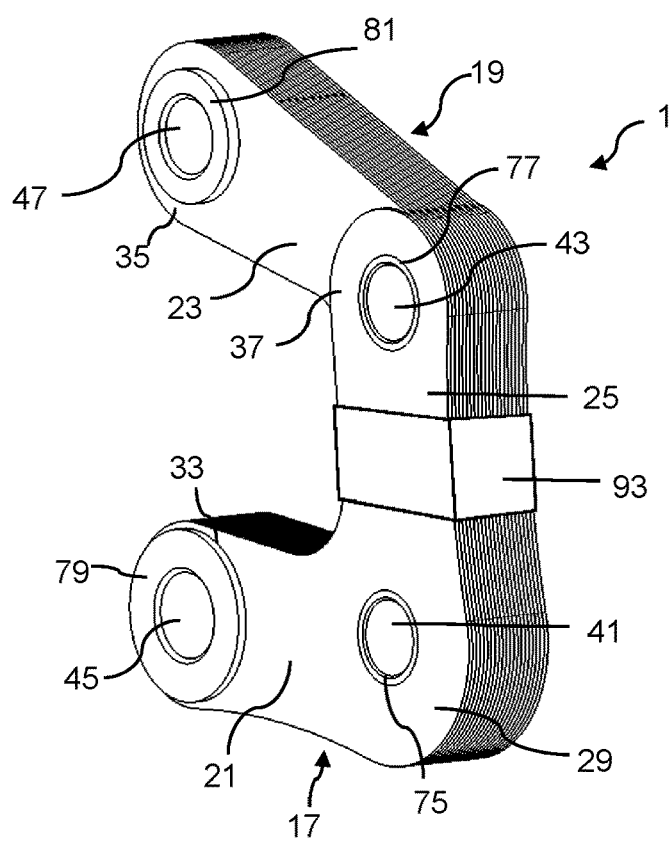
FIG. 9 shows an elevated view of the connection assembly of FIG. 8.

A third exemplary embodiment of a connection assembly 1 is shown in FIGS. 8 and 9. Only those features of the third exemplary embodiment will be described in more detail that differ from the first exemplary embodiment shown in FIGS. 1 to 5 and 12.

In the third exemplary embodiment a clamping element 93 also referred to as clamping device 93 extends around the second legs 25, 27 of the first and second load-bearing devices 17, 19 and holds the load-bearing devices 17, 19 together. Thereby, the clamping device 93 provides a secondary load path in case one of the first and the second load-bearing devices 17, 19 should fail. If the clamping device 93 is installed after the connection assembly 1 has been installed, it is possible to maintain the option of adjusting the opening angle of the C-shaped connecting assembly 1.

Figure 10:
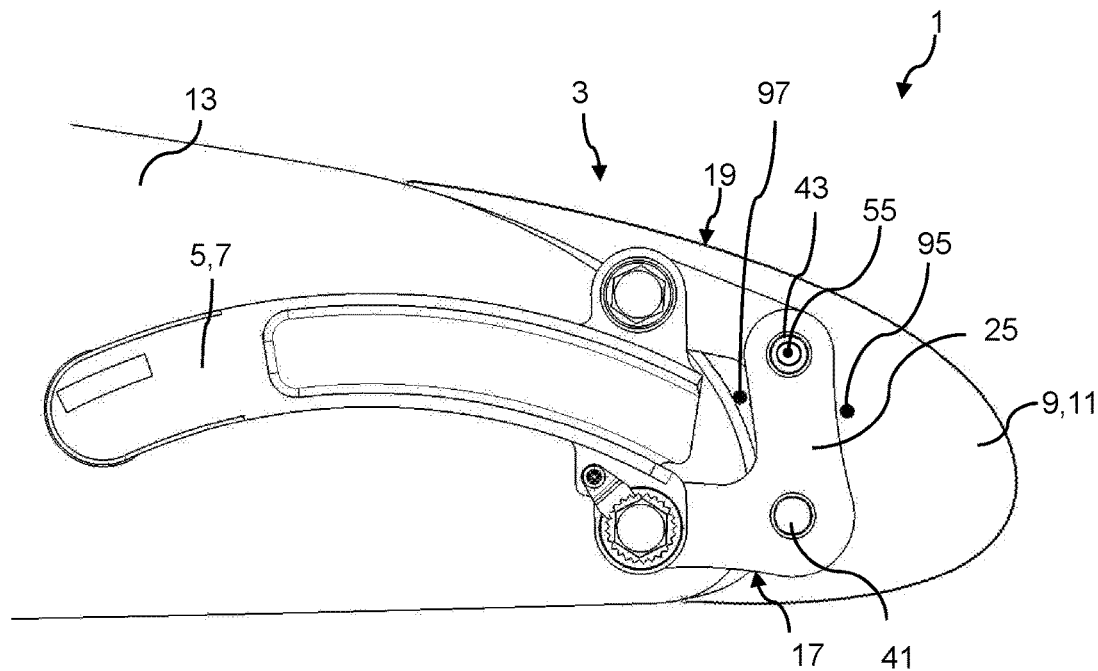
FIG. 10 shows a second exemplary embodiment of a slat assembly.

FIG. 10 shows a second exemplary embodiment of a slat assembly 3. Only those elements of the second exemplary embodiment of FIG. 10 described in more detail differ from the corresponding elements of the first exemplary embodiment described with reference to FIG. 1. In FIG. 10 various reference numerals have been omitted to keep the Figure intelligible.

The second exemplary embodiment of a slat assembly 3 differs from the slat assembly 3 of FIG. 1 only in that two limiting means 95, 97, for example, in the form of protrusions or shafts attached to the slat 11 provided. When the first and/or the second load-bearing devices 17, 19 rotate about the adjustment axis 55 relative to the slat 11, their respective second legs 25, 27 will eventually engage one of the first and the second limiting means 95, 97. The limiting means 95, 97 then limit the relative angular motion of the first and second load-bearing devices 17, 19 relative to the slat 11 to a predefined angle. Hence, by means of the first and second limiting means 95, 97 a secondary load path is provided in case one of the first and the second load-bearing devices 17, 19 should fail.

Figure 11:
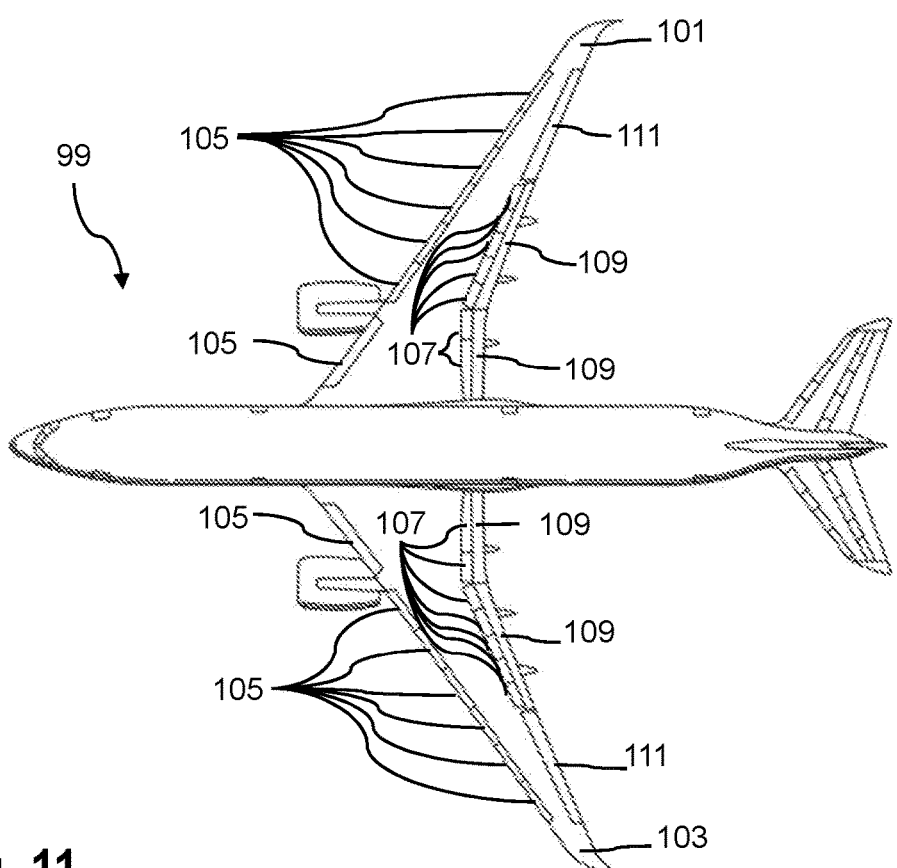
FIG. 11 shows an exemplary embodiment of an aircraft.

Finally, FIG. 11 shows an exemplary embodiment of an aircraft 99 comprising two main wings 101, 103. Each of the main wings 101, 103 comprises a plurality of slat 105, spoilers 107, flaps 109 and ailerons 111. In the exemplary embodiment the slats 105 of the aircraft 99 are part of an exemplary embodiment of a slat assembly 3 using and are at least partially mounted to the main wings 101, 103 of the aircraft 99 using a connecting assembly according to any of the exemplary embodiments. The connection assemblies are not shown in FIG. 11. It is also possible that, for example, the € 107 or the flaps 109 are mounted to the main wings 101, 103 using one of the exemplary embodiments of a connection assembly.

The advantages of the aircraft 99 correspond to the advantages of the slat assembly and the connection assembly used therein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection assembly for transmitting loads in a load plane between a first wing element and a second wing element,
    wherein the connection assembly is C-shaped and comprises a first load-bearing device and a second load-bearing device,
    wherein each of the first and second load-bearing devices is L-shaped and comprises a first leg, a second leg and a joint region,
    wherein the first leg extends parallel to the load plane and away from the joint region towards a first end region and wherein the second leg extends parallel to the load plane and away from the joint region towards a second end region,
    wherein the second legs of the first and the second load-bearing devices extend in parallel to one another,
    wherein a first coupling portion for connecting the connection assembly to the second wing element is formed in the joint region of the first load-bearing device,
    wherein a second coupling portion for connecting the connection assembly to the second wing element is formed through the second end region of the first load-bearing device and through the joint region of the second load-bearing device,
    wherein a third coupling portion for connecting the connection assembly to the first wing element is formed in the first end region of the first load-bearing device,
    wherein a fourth coupling portion for connecting the connection assembly to the first wing element is formed in the first end region of the second load-bearing device, and
    wherein the second leg of the second load-bearing device is connected to the second leg of the first load-bearing device.

2. The connection assembly according to claim 1, wherein the second leg of the second load-bearing device is connected to the second leg of the first load-bearing device such that the first load-bearing device and the second load-bearing device can be rotated relative to one another by a predefined first angle and about an adjustment axis extending perpendicular to the load plane and through the second coupling portion.

3. The connection assembly according to claim 2,
    wherein the connecting assembly comprises a first connector to connect the connection assembly at the first coupling portion to the second wing element and to connect the second leg of the second load-bearing device to the joint region of the first load-bearing device,
    wherein in the joint region of the first load-bearing device the first coupling portion is configured to receive the first connector in such a manner that movement of the first load-bearing device relative to the first connector in a plane extending parallel to the load plane is prevented by engagement of the first load-bearing device with the first connector,
    wherein the first coupling portion is also formed in the second end region of the second load-bearing device, and
    wherein in the second end region of the second load-bearing device the first coupling portion is configured to limit a relative rotation between the first load-bearing device and the second load-bearing device about the adjustment axis to the predefined first angle by providing first and second end stops for engagement of the first connector with the second load-bearing device.

4. The connection assembly according to claim 3, wherein in the second end region of the second load-bearing device the first coupling portion is configured as an elongated hole extending along a circle about the adjustment axis.

5. The connection assembly according to claim 3,
    wherein a shape of the first coupling portion in the second end region of the second load-bearing device when projected on the load plane corresponds to a shape of the first coupling portion in the joint region of the first load-bearing device when projected on the load plane, and
    wherein an area of the first coupling portion in the second end region of the second load-bearing device when projected on the load plane exceeds an area of the first coupling portion in the joint region of the first load-bearing device when projected on the load plane.

6. The connection assembly according to claim 3, wherein at least one of:
    the first connector connecting the connection assembly at the first coupling portion to the second wing element is supported by a first bushing at least in the first load-bearing device;
    a second connector connecting the connection assembly at the second coupling portion to the second wing element and the first load-bearing device to the second load-bearing device is supported by a second bushing in the first and second load-bearing device;
    a third connector connecting the connection assembly at the third coupling portion to the first wing element is supported by a third bushing in the first load-bearing device; or
    a fourth connector connecting the connection assembly at the fourth coupling portion to the first wing element is supported by a fourth bushing in the second load-bearing device.

7. The connection assembly according to claim 1,
    wherein a fifth coupling portion to connect the first load-bearing device to the second load-bearing device is formed in the second leg of the of the first load-bearing device between the joint region and the second end region of the first load-bearing device,
    wherein the fifth coupling portion is also formed in the second leg of the second load-bearing device between the joint region and the second end region of the second load-bearing device,
    wherein the connection assembly further comprises a fifth connector extending through the fifth coupling portion to transfer loads acting parallel to the load plane between the second legs of the first and the second load-bearing devices, and
    wherein the fifth connector is supported by a fifth bushing in the first load-bearing device and the second load-bearing device.

8. The connection assembly according to claim 7,
wherein the second leg of the second load-bearing device is connected to the second leg of the first load-bearing device such that the first load-bearing device and the second load-bearing device can be rotated relative to one another by a predefined first angle and about an adjustment axis extending perpendicular to the load plane and through the second coupling portion, and
wherein in the second leg of the second load-bearing device, the fifth coupling portion is configured as an elongated hole extending along a circle about the adjustment axis.

9. The connection assembly according to claim 7,
wherein a shape of the fifth coupling portion in the second leg of the second load-bearing device when projected on the load plane corresponds to a shape of the fifth coupling portion in the second leg of the first load-bearing device when projected on the load plane, and
wherein an area of the fifth coupling portion in the second leg of the second load-bearing device when projected on the load plane exceeds an area of the fifth coupling portion in the second leg of the first load-bearing device when projected on the load plane.

10. The connection assembly according to claim 1,
wherein the first load-bearing device is formed by a plurality of first plates,
wherein the second load-bearing device is formed by a plurality of second plates,
wherein each of the plurality of first plates and each of the plurality of second plates have two opposite extended surfaces, wherein each extended surface extends parallel to the load plane,
wherein the first coupling portion, the second coupling portion and the third coupling portion are at least partially formed in each of plurality of first plates,
wherein the first coupling portion, the second coupling portion and the fourth coupling portion are at least partially formed in each of the plurality of second plates, and
wherein the plurality of first and second plates are disposed on each other in alternating order such that every extended surface of a first plate of the plurality of first plates arranged directly adjacent to an extended surface of another plate is arranged directly adjacent to an extended surface of a second plate of the plurality of second plates and every extended surface of a second plate of the plurality of second plates arranged directly adjacent to an extended surface of another plate is arranged directly adjacent to an extended surface of a first plate of the plurality of first plates.

11. The connection assembly according to claim 10, wherein at least one of:
first spacer plates are arranged between adjacent first plates of the first load-bearing device in the first end region of the first load-bearing device, and the third coupling portion is partially formed in the first spacer plates; or
second spacer plates are arranged between adjacent second plates of the second load-bearing device in the first end region of the second load-bearing device, and the fourth coupling portion is partially formed in the second spacer plates.

12. The connection assembly according to claim 10,
wherein the first coupling portion is formed by first cylindrical recesses in the plurality of first plates and the plurality of second plates, and
wherein at least one first cylindrical recess formed in the plurality of first plates has a smaller inner diameter than each first cylindrical recess formed in the plurality of second plates.

13. The connection assembly according to claim 1, wherein a clamping element is provided extending around the second legs of the first load-bearing device and the second load-bearing device between the first coupling portion and the second coupling portion and holding the first load-bearing device and the second load-bearing device together such that loads acting parallel to the load plane can be transferred between the second legs of the first load-bearing device and the second load-bearing device via the clamping element.

14. A slat assembly for a main wing of an aircraft, the slat assembly comprising a slat and an elongate slat track,
wherein the slat is connected to the slat track by means of a connection assembly according to claim 1, and
wherein the slat track is provided for movably connecting the slat assembly to the main wing.

15. The slat assembly according to claim 14,
wherein the first and the second coupling portions are connected to the slat, and
wherein the third and the fourth coupling portion are connected to the slat track.

16. The slat assembly according to claim 14,
wherein the second leg of the second load-bearing device is connected to the second leg of the first load-bearing device such that the first load-bearing device and the second load-bearing device can be rotated relative to one another by a predefined first angle and about an adjustment axis extending perpendicular to the load plane and through the second coupling portion,
wherein the slat comprises a first limiting means and a second limiting means, and
wherein the first limiting means and the second limiting means are attached to the slat and provided for engaging at least one of the second legs of the first load-bearing device and the second load-bearing device to limit a rotation of at least one of the first load-bearing device and the second load-bearing device relative to the slat about the adjustment axis to a predefined second angle.

17. An aircraft comprising:
a main wing, and
a slat assembly according to claim 14,
wherein the slat of the slat assembly is mounted to the main wing by means of the slat track and the connection assembly.

* * * * *